Figure 1:
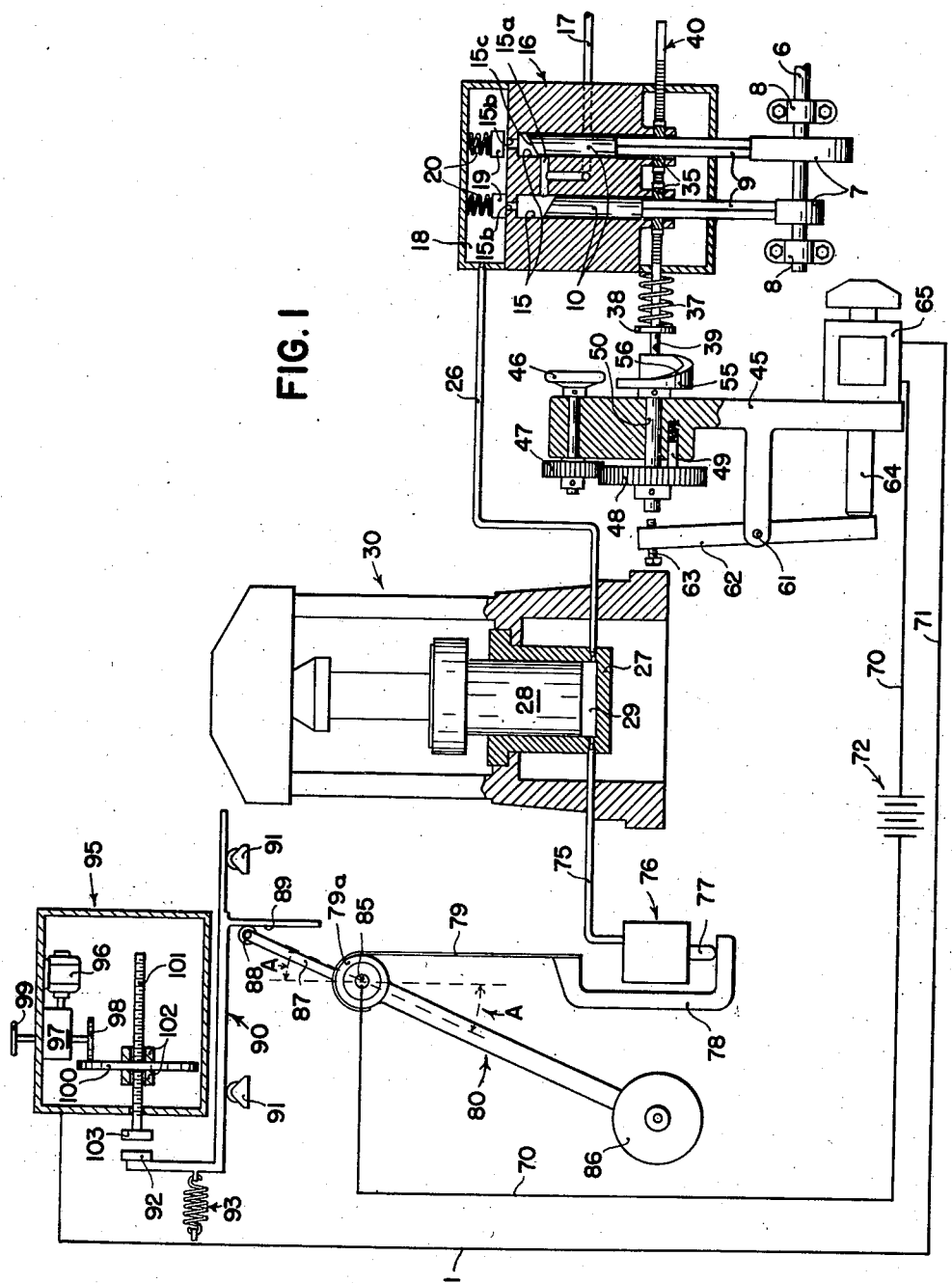

Oct. 12, 1943.  A. SONNTAG  2,331,577
HYDRAULIC PRESSURE CONTROL FOR TESTING MACHINES
Filed Dec. 4, 1939

INVENTOR:
ALFRED SONNTAG
BY
ATTORNEY

Patented Oct. 12, 1943

2,331,577

UNITED STATES PATENT OFFICE 2,331,577

HYDRAULIC PRESSURE CONTROL FOR TESTING MACHINES

Alfred Sonntag, Moline, Ill., assignor to American Machine and Metals, Inc., New York, N. Y., a corporation of Delaware Application December 4, 1939, Serial No. 307,426

14 Claims. (Cl. 265—14)

This invention relates to a mechanism for controlling a hydraulic system in such a manner as to cause a change of pressure in the system to take place in a predetermined manner regardless of other changes in the system which might affect the quantity of liquid to be delivered at various pressures.

In testing materials under strain the results are in part dependent on the length of time to which the specimen is subjected to the strains. To obtain comparative results, therefore, it is desirable to conduct each of the tests to be compared with the same rate of application of the pressure, that is that the pressure shall bear the same functional relationship to the time.

In many applications the pressure on a system should increase at a uniform rate in order to accomplish a desired result. As the pressure rises, there may be an increased or decreased demand for fluid either because of the increased leakage or because some hydraulically operated apparatus connected into the system, such as a plunger, functions at a faster rate. For example, a hydraulic testing machine may consist of a plunger which is forced against a specimen to be tested in compression and a pump which may be set to deliver liquid at a constant rate. It is desired that the pressure which is exerted by this plunger upon the specimen being tested in compression shall increase at a uniform rate. This may be expressed, for example, as an increase of 50,000# per minute in the total pressure exerted upon the specimen. If the pressure starts at zero, it is obvious that at the outset there will be very little leakage around the plunger. As the pressure increases, this leakage will be greater. The pressure exerted on the specimen is based upon the degree to which the specimen is compressed. It may be that at the outset the specimen is not touching over the entire bearing face and, therefore, initially, to secure an increase of pressure at the desired rate, the plunger may move $\frac{1}{16}$" the first minute. After the bearing across the whole surface has become uniform, the ram may move at a lower rate, perhaps $\frac{1}{8}$" for the second minute, while the pressure is rising from 50,000# to 100,000#. Depending upon the nature of the specimen, movement may then be uniform for awhile so that for each minute the ram will move $\frac{1}{8}$" and the pressure will increase for another 50,000# increment.

A time will come when the specimen will approach its elastic limit or collapse. Then, in order to increase the load by 50,000# a minute, the ram will again have to move faster; possibly $\frac{1}{16}$" in the minute which failure begins and more, perhaps $\frac{5}{8}$", in the minute thereafter as failure becomes more pronounced.

Thus it will appear that the amount of liquid which is to be supplied will vary. I have illustrated this by an example involving compression; the same would be true of a tension or flexure or any other kind of test. In addition to the variations caused by the rate at which the specimen compresses, there necessarily are other losses which vary with the pressure. There will be leakage around the plunger, no matter how carefully it is fitted, possibly other leakages in the system and its connections, absorption of fluid by the lines because of the distension of the pipes giving them a larger capacity, and even because of the compressibility of the fluid requiring additional fluid to make up for the smaller volume which the fluid already in the system now occupies.

For all of these reasons it is necessary to provide a variable quantity of fluid and this variation must be controlled by the pressure and the time that has elapsed from the beginning of the test.

Hitherto this has been accomplished manually. The opereator attempts to increase or decrease the quantity of fluid supplied in such manner that the position on the pressure indicator will cover each 50,000# interval of pressure in equal periods.

One of the objects of this invention is to secure an approximation to a preselected pressure time curve by providing a pressure liquid supply in excess of that which will be required, as for example by a pump, together with means responsive to the pressure to relieve the fluid to a quantity less than that required to maintain the pressure curve desired. This can be accomplished by setting the pump to over-run the desired result and providing means which become active when the pressure crosses the desired curve to temporarily reduce the amount of fluid supplied sufficient to drop the pressure below the line from which point the same process is repeated—a gradual rise of pressure until the curve is crossed, the automatic change of the pump discharge to a substantially lower rate until the pressure drops away from the curve, this being repeated indefinitely.

The figure represents the invention as applied to a compression testing machine and part of the element being shown in section. It will, however, be understood that this particular embodiment is chosen for convenience of illustration only and that the invention may also be applied to any other machine in which it is desired to maintain a constant pressure or to establish a pressure as a definite function of the time.

As illustrated, the device comprises a testing machine 30 supplied with liquid under pressure by a device 16. A hand control device 45 may be set to limit the quantity of fluid to be delivered to the testing machine 30 to something more than that required to maintain the pressure-time-curve desired and this device is under the joint control of a time controlling element 95 and a pressure control element 80 so that whenever the pressure at the testing machine tends to exceed that corresponding to the time curve selected, the delivery will be reduced sufficient to maintain that curve.

I have already spoken of the maintenance of a straight line relationship between the pressure and time by increasing the pressure at a constant rate. It may, however, also be employed to maintain any other curve desired between the pressure and time. Thus the pressure may be increased at an increasing rate for certain purposes or the rate of increase may be increased for a time and then decreased according to any predetermined scheme. This may be accomplished, for example, in the form shown herein by moving hand wheel 99 axially as will be explained hereinafter.

Furthermore, the rate of pressure increase might be zero. In that event, the pressure would remain constant after reaching a certain point, the pump delivering only enough fluid to periodically offset the drop of pressure due to leakage but not enough to raise the pressure above the original certain point. This special case of the general case of controlling the rate of pressure increase is a very important one in the testing machine field. It is often desired to hold a specimen for an extended period under a uniform pressure and during this period the specimen may be subjected to contraction or expansion requiring that additional fluid be supplied to, or returned from, the testing machine cylinder to provide that uniform pressure on the specimen. This change of size may be due to internal changes or due to heat, electrical, magnetic or other forces exerted on the specimen while held under pressure.

As illustrated the testing machine comprises a cylinder 27 in which there moves a piston 28 which is supplied in the usual manner with fluid admitted to the space 29 below the piston. The specimen to be tested in this particular machine may be subjected to the pressure of the piston 28. Fluid is admitted to the space 29 by a conduit 26 and a second conduit 75 leads to the pressure control element 80 which will be later described.

The pressure supply device 16 comprises in general a variable delivery pump of the type generally referred to as a Diesel pump. The numeral 6 represents a drive shaft carrying oval cams 7 driving, by suitable followers, rods 9 which in turn operate pistons 10 fitting within cylinders 15 in the frame 16. The shaft 6 may be mounted in hangers 8 or in any other convenient manner. Fluid is admitted to the cylinders 15 by a conduit 17 connected to the cylinders through ports 15a in the side walls of the cylinders in position to be uncovered by the pistons during their travel. A port 15b controlled by a check valve 19 operated by a spring 20 connects each cylinder 15 with the discharge chamber 18 which in turn is connected by the conduit 26 to the chamber 29 of the testing machine.

For the purpose of varying the amount of liquid delivered by the pistons the outer face of them is cut away at an angle as shown at 15c and means are provided to turn the pistons about their axis to vary the point in the piston at which the ports 15a are uncovered by the pistons.

As shown the rods 9 are square in cross section and slidably engaged gears 35 are meshed with the teeth of a rack 40 so that on an endwise movement of the rack the angularity of the pistons and hence the discharge of the pump is varied. A spring 37 confined by a collar 38 urges the rack to one extreme of its travel at which the discharge of the pistons is maximum.

The control element 45 comprises a shaft 50 journaled in the frame on which is pinned a circular cam 55 having a cam surface 56 of helical form which remains in alignment with the end 39 of the rack 40 during rotation of the shaft 50. The helical form of the cam surface serving to limit the movement of the rack to the left.

A gear 48 is fixed on the shaft 50 at a point to permit a certain endwise movement of the shaft 50 and is in mesh with a second gear 47 which may be rotated by the hand wheel 46, so that this hand wheel may be used to adjust the position of the cam 55 and hence the maximum discharge of the pump 16.

The shaft 50 is movable endwise in its bearings and a spring pressed pin 49 bears against the inner face of the gear 48 serving in this manner to hold the gear in any angularly adjusted position and to move the shaft 50 as far to the left as possible. A lever 62 pivoted to the frame at 61 has an adjusting screw 63 in position to engage the end of the shaft 50 and this lever 62 has its other end in engagement with a rod 64 adapted to be operated by a solenoid 65, the parts being so arranged that when the solenoid is operated in response to the pressure and time control, the adjusting screw 63 will bear against the end of the shaft 50 and through the medium of the cam surface 56 cause a movement to the right of the rack 40, thus reducing the discharge of the pump.

The pressure control element 80 comprises, as illustrated, a pendulum 86 pivoted to the frame at 85 and controlled by a wire or a strap 79 wound on a pulley 79a on the axis of the pendulum and having its other end connected to a frame 78 responsive to a piston 77 in a pressure cylinder 76 which pressure cylinder is fed with liquid from the chamber 29 by the conduit 75. Thus the position of the frame 78 and of the pendulum 86 is determined by the pressure within the cylinder 76.

The pendulum 86 has an upwardly extending arm 87 having a roller 88 in position to engage a depending arm 89 on a frame 90 carrying a contact 92. This contact is in position to engage a contact 103 when the frame is moved to the right as seen in the figure. Since the angle A of movement of the pendulum bears a sine relation to the pressure and also bears a sine relation to the lateral movement of the frame 90 it will be clear that the frame 90 moves in proportion to the pressure within the system against restoring spring 93.

A conductor 71 connects the contact 103 with the solenoid 65 and another conductor 70 connects the solenoid with a battery 72 which in turn is connected to the pendulum 86 and through it to contact 92.

With this construction whenever the pressure beneath the piston 28 tends to exceed that for which the device is set the pendulum 86 will move the frame 90 to bring the contacts 92 and 103 into engagement to close the circuit and actuate the solenoid 65, thus reducing the amount of liquid delivered by the pump to an amount below that which is sufficient to maintain the pressure. As soon thereafter as the pressure falls below the standard for which the instrument is then set the contact is broken between 92 and 103 permitting the rod 40 again to be thrust to the left as seen in the figure and the pressure is again restored within the system.

As will be seen the construction heretofore shown will permit the maintenance of a fixed pressure within the space 29. The pump 16 being adjusted to deliver a little more than the amount required by the system under fixed pressure to maintain the losses of the system at that pressure and to provide for another change in volume in which distortion or movement of the specimen may produce.

This maintenance of a fixed pressure corresponds to the maintenance of a fixed position of the contact 103 and the amount of the fixed pressure maintained will be determined by the position of the contact 103.

The device 95 is constructed and arranged to permit the adjustment of the pressure which the pendulum will maintain according to any fixed predetermined curve relation to the time. This is accomplished by varying the position of the contact 103 as a predetermined function of the time.

Devices for varying the position of a contact according to any predetermined plan are old and such devices may take many forms in which the contact is moved by a means which is driven by a clockwork or motor. In one form, by way of illustration, the contact 103 is carried by a screw threaded rod 101 which is splined to the frame to permit endwise movement but not rotation. A nut 102 threaded on the rod is mounted in the frame to permit rotation but not endwise movement. A disc 100 fixed on the nut 102 is driven by a motor 96 through a suitable speed reduction device 97 which is so chosen as to move the contact 103 in accordance with the time pressure curve desired. Ordinarily the simplest curve of time and pressure is that the pressure shall be maintained constant throughout the test. This is accomplished by allowing the contact 103 to remain idle during the test, as we have already described. The most simple manner in which the pressure may be varied during the test is to cause it to increase uniformly at a predetermined constant rate. It is desirable, however, to permit the rate to be changed between one test and another to give the machine availability.

The motor 96 will ordinarily be a constant speed motor and the connection between it and the nut 102 may comprise a friction disc 98 driven by the speed reduction device 97 and mounted in position to engage the said face of the disc 100. This disc 98 is controlled by hand wheel 99 by which it can be moved toward and from the axis of the rod 101. In this manner as the disc 98 is moved toward the center the speed of movement of the contact 103 is increased or it may be moved toward the periphery in which case the speed of movement of the contact is decreased.

For any particular setting, however, of the disc 98 the rate of increase of pressure upon the specimen will be fixed, the particular fixed rate depending upon the setting.

If, for any reason, it should be desired to apply the strain according to any other pressure time curve that may readily be done by moving the disc 98 in accordance with the variable rate determined upon. Such variation of rate may be accomplished manually by changing the hand wheel 99 or, as will be readily understood, any form of automatic control may be employed to fit the particular time curve desired. For example the wheel 98 itself may be moved endwise.

When making a test in which the pressure is to increase at a uniform rate of speed, set the handwheel 46 so that the cam 55 will cause the pump 16 to deliver slightly more than sufficient fluid to move the ram at a rate to build up the pressure per minute desired. Generally this rate can be estimated from previous trials. Contact 103 is placed so that it will be contacted by contact 92 with no load. The solenoid will act in the manner already indicated to cut the fluid supplied and to prevent enough fluid to be delivered to start the machine.

If, for example, we wish to perform a test in which the specimen shown is to be loaded at a rate of 50,000# per minute, the operator moves the contact 103 to contact 92 with the machine unloaded. Disc 99 is pushed in to give the button 103 a known linear travel away from button 92 when the constant speed motor 96 is started. By previous calibration the button 103 is set at a rate to which 92 would move if it were indicating a load increase of 50,000# added every minute. It will break the contact with 92, the solenoid 65 will be deenergized, control unit 45 will take the position shown, pressure will build up and 92 will again contact button 103. That will momentarily prevent the pressure building up, will allow button 103 to move on and the contact being broken. The pressure will then again build up.

Thus the pressure on the specimen is built up by a series of steps separated by a slower rate of pressure increase or even a drop in pressure.

If a test is to be performed in which the load is to be decreased uniformly, the button 103 is brought into the position corresponding to the load from which the decrease is to take place. The position might be such as indicated in the drawing. The manual control 46 is then set to give enough volume to bring the plunger up and build the pressure up to bring the button 92 into contact with button 103. The handwheel 46 now moved to a new position giving a pump discharge not quite sufficient to maintain the pressure with the solenoid 65 active, for now button 103 and contact 92 form the electric circuit through the solenoid, the motor 96 is now started in a direction to move the button 103 against the contact 92. We might expect this to jam the mechanism, but this will not happen.

As the output of the pump is now not quite sufficient to maintain the pressure against leakage, the plunger 77 will recede, the weight 86 will sink, the button 92 will be moved to the left, breaking the contact, interrupting the circuit through the solenoid, and thus giving a larger discharge which will bring the pressure up again and carry the contact 92 back toward 103. Were the button 103 stationary, this would merely hold a constant pressure, but as in the meantime button 103 has moved toward the left, the contact will be established at a lower value.

The means shown for carrying out the invention in its application to a testing machine are by way of illustration and not by way of limitation. Other means for accomplishing the same result and other applications for the invention will occur to those skilled in the art.

Having described my invention, what I claim as new and desire to secure by Letters Patent, is:

1. Means for maintaining a predetermined pressure condition within a hydraulic system comprising a pump of the constant discharge type having means for varying the rate of discharge, means for setting the rate of discharge to a rate in excess of that required to maintain the pressure condition, mechanism for altering the rate to that required by the pressure condition and pressure responsive means for actuating the rate altering means to lessen the rate as soon as the pressure exceeds that required by the momentary value of the predetermined pressure condition, and time controlled means for altering the momentary value in accordance with the predetermined pressure condition.

2. Means for maintaining a predetermined pressure condition within a hydraulic system comprising a pump of the constant discharge type having means for varying the rate of discharge, including a thrust rod and a cam for engaging the end of said rod to determine its endwise position and thereby the maximum rate of discharge of the pump, a pressure responsive device, means engaged by the pressure responsive device when the predetermined pressure condition is reached for moving said cam in position to operate said rod to reduce the rate of discharge of said pump when the pressure exceeds the momentary value of the predetermined pressure condition, and time controlled means for altering the momentary value in accordance with the predetermined pressure condition.

3. A device in accordance with claim 2 in which the means engaged by pressure responsive device includes a switch to close an electric circuit and a solenoid within said electric circuit having a plunger adapted to operate said cam.

4. A device in accordance with claim 2 in which the cam is mounted upon a shaft, said shaft being movable endwise a distance sufficient to reduce the rate of discharge of the pump to below that required by the system, spring means for holding said shaft in the opposite direction, said means engaging the pressure-responsive device including a solenoid for moving said shaft lengthwise to reduce the rate of discharge and said pressure responsive device being connected to actuate said solenoid.

5. A device in accordance with claim 2 in which the cam is mounted upon a rotatable shaft and is so constructed and arranged that by rotation of said shaft the end position of the rate adjusting rod is determined, said shaft being movable endwise a distance sufficient to reduce the rate of discharge of the pump to below that required by the system, spring means for holding said shaft in the opposite direction, said means engaging the pressure-responsive device including a solenoid for moving said shaft lengthwise to reduce the rate of discharge and said pressure responsive device being connected to actuate said solenoid.

6. A testing machine having a hydraulic piston and cylinder for applying power, a constant rate pump for supplying liquid to said cylinder, a thrust rod for changing the rate of said pump, a control mechanism, an endwise movable shaft carrying a cam for engaging said thrust rod to reduce said rate, means for moving said cam on the shaft to change the rate independent of said control mechanism, and means for operating said control mechanism to reduce said rate a fixed amount so large that the pressure will drop when the pressure within the cylinder exceeds a predetermined pressure curve.

7. A device according to claim 6 in which the operating means for the control mechanism has an element responsive to time and an element responsive to pressure within the cylinder, and in which these two elements are connected to operate said control mechanism when the pressure within the cylinder exceeds a predetermined pressure curve.

8. A testing machine having, in combination, a hydraulic piston and cylinder for applying power, a pump adjustable by a manually operated element to deliver fluid to the cylinder at a selected rate, means for temporarily reducing the pump delivery by a fixed amount without disturbing the manually operated pump delivery control adjustment, a mechanism responsive to the total pressure exerted by the testing machine, means contacted by the pressure responsive mechanism of the testing machine only when the desired pressure has been obtained, this contact operating the means to temporarily reduce the delivery of the pump to a point where the pressure on the testing machine drops and the receding pressure responsive mechanism breaks the contact with the means contacted by the pressure responsive mechanism and restores the selected rate of pump delivery.

9. In a testing machine adapted to automatically maintain the load on a specimen within a range just below selected values, in combination, a hydraulic cylinder, a piston movable therein for applying the load to the specimen, a pump for supplying liquid at a selected rate to the cylinder, an abutment on the pump, an axially movable rod for changing the rate of fluid delivery of the pump, a wedge slidable on the abutment and adapted to move the rod axially for selecting the desired rate of constant delivery, automatic means responsive to predetermined pressures in the cylinder adapted to move the wedge off the abutment thereby reducing the rate of delivery temporarily.

10. In a testing machine in accord with claim 9, said automatic means responsive to predetermined pressures including means for measuring elapsed time, means for predetermining the pressures according to a pattern based upon elapsed time so that the load on the specimen will be held below a pressure determined by the lapse of time after beginning the test.

11. An apparatus having, in combination, an expansible fluid system, a pump capable of delivering fluid to the system at one of several constant rates, an axially movable rod controlling the rate of delivery of the pump, a cam against which the rod bears that can be rotated to select a rate of delivery somewhat in excess of the requirements of the system, a device responsive to a predetermined pressure in the fluid system adapted to bodily move the cam to decrease the rate of delivery to a value insufficient to maintain the predetermined pressure in the system.

12. An apparatus in accordance with claim 11 in which the device responsive to a predetermined pressure includes an electric circuit, a switch in the circuit closed at the predetermined pressure in the field in the system, and a solenoid in the circuit to move the cam bodily when the switch is closed.

13. An apparatus in accordance with claim 11 in which the cam is mounted on a shaft and the device responsive to the predetermined pressure in the fluid system includes a solenoid that moves the shaft supporting the cam.

14. An apparatus in accordance with claim 11 in which the cam is mounted on a shaft that is rotated to select the desired rate of delivery of the pump and the device responsive to the predetermined pressure in the fluid system moves the cam shaft axially.

ALFRED SONNTAG.